(12) United States Patent
Kim et al.

(10) Patent No.: US 9,152,262 B2
(45) Date of Patent: Oct. 6, 2015

(54) TOUCH SENSOR INTEGRATED TYPE DISPLAY DEVICE COMPRISING SHIELDING ELECTRODES FORMED BETWEEN A FIRST ELECTRODE AND A PIXEL ELECTRODE

(71) Applicant: LG Display Co., Ltd., Seoul (KR)

(72) Inventors: Jinseong Kim, Jeollabuk-do (KR); Juhan Kim, Gyeonggi-do (KR); Manhyeop Han, Seoul (KR)

(73) Assignee: LG Display Co., Ltd., Seoul (KR)

( * ) Notice: Subject to any disclaimer, the term of this patent is extended or adjusted under 35 U.S.C. 154(b) by 41 days.

(21) Appl. No.: 14/097,427

(22) Filed: Dec. 5, 2013

(65) Prior Publication Data

US 2014/0168539 A1    Jun. 19, 2014

(30) Foreign Application Priority Data

Dec. 13, 2012 (KR) .................. 10-2012-0145345

(51) Int. Cl.
*G02F 1/1335* (2006.01)
*G06F 3/041* (2006.01)

(52) U.S. Cl.
CPC ..................................... *G06F 3/041* (2013.01)

(58) Field of Classification Search
USPC ............................... 349/1, 121; 345/175–178
See application file for complete search history.

(56) References Cited

U.S. PATENT DOCUMENTS

2011/0228189 A1*   9/2011   Oh et al. ..................... 349/43

* cited by examiner

*Primary Examiner* — Paul Lee
(74) *Attorney, Agent, or Firm* — Morgan, Lewis & Bockius LLP

(57) ABSTRACT

A touch sensor integrated type display device includes a plurality of gate lines and a plurality of data lines which are formed to cross over each other; a plurality of pixel electrodes respectively formed in areas defined by crossings of the plurality of gate lines and the plurality of data lines; a plurality of first electrodes, each of which is formed between the pixel electrodes and in parallel with the gate line, the pixel electrodes being adjacent to each other with the gate line interposed therebetween; a plurality of second electrodes formed in parallel with the data lines, at least a portion of each of the plurality of second electrodes overlapping the pixel electrode; and a shielding electrode formed between each first electrode and each second electrode.

6 Claims, 6 Drawing Sheets

200~# TOUCH SENSOR INTEGRATED TYPE DISPLAY DEVICE COMPRISING SHIELDING ELECTRODES FORMED BETWEEN A FIRST ELECTRODE AND A PIXEL ELECTRODE

This application claims the benefit of priority under 35 U.S.C. §119(a) to Korea Patent Application No. 10-2012-0145345 filed on Dec. 13, 2012, the entire contents of which is incorporated herein by reference herein in its entirety.

BACKGROUND OF THE INVENTION

1. Field of the Invention

Embodiments of the invention relate to a touch sensor integrated type display device capable of recognizing a user's touch, and more particularly to a touch sensor integrated type display device capable of increasing sensitivity of a touch sensor by reducing a change amount of a capacitance generated by touch driving electrodes.

2. Discussion of the Related Art

In recent years, various input devices such as a keyboard, a mouse, a joystick, and a digitizer have been used to construct interfaces between users and home appliances or information telecommunication devices. However, when the user makes use of these input devices, user's dissatisfaction increases because the user is required to know how to use the input devices and the input devices occupy space. Therefore, a convenient and simple input device that can reduce erroneous operation is required. In response to this demand, a touch sensor for enabling the user to input information by directly touching the screen with his or her hand or a pen was suggested.

The touch sensor has a simple configuration capable of reducing erroneous operations. The user can also perform an input action without using a separate input device, and can quickly and easily manipulate a device through contents displayed on the screen. Accordingly, the touch sensor has been applied to various display devices.

The touch sensor used in the display devices may be classified into an add-on type touch sensor and an on-cell type touch sensor. The add-on type touch sensor is configured such that the display device and the add-on type touch sensor are individually manufactured and then the add-on type touch sensor is attached to an upper substrate of the display device. The on-cell type touch sensor is configured such that components constituting the on-cell type touch sensor are directly formed on the surface of the upper glass substrate of the display device.

There is a problem that a thickness of the display device increases because the add-on type touch sensor has the structure in which the add-on type touch sensor is mounted on the display device. Further, the visibility of the display device is reduced because of a reduction in brightness of the display device due to the increased thickness.

On the other hand, the on-cell type touch sensor shares the glass substrate with the display device because the on-cell type touch sensor has the structure in which the on-cell type touch sensor is formed on the surface of the glass substrate of the display device. Therefore, a thickness of the display device using the on-cell type touch sensor is less than a thickness of the display device using the add-on type touch sensor. However, the entire thickness of the display device using the on-cell type touch sensor increases because of a touch driving electrode layer, a touch sensing electrode layer, and an insulating layer for insulating the touch driving electrode layer and the touch sensing electrode layer which constitute the on-cell type touch sensor.

Accordingly, there is a need for a touch sensor integrated type display device capable of solving the problems of the above-described kinds of touch sensors.

SUMMARY OF THE INVENTION

Embodiments of the invention provide a touch sensor integrated type display device capable of reducing a thickness and increasing touch sensitivity by using touch driving electrodes and touch sensing electrodes for recognizing a touch event of the display device as a component of the display device.

Embodiments of the invention also provide a touch sensor integrated type display device capable of increasing touch sensitivity and reducing parasitic capacitance by reducing mutual capacitance between touch driving electrodes and touch sensing electrodes.

In one aspect, there is a touch sensor integrated type display device including a plurality of gate lines and a plurality of data lines which are formed to cross over each other; a plurality of pixel electrodes respectively formed in areas defined by crossings of the plurality of gate lines and the plurality of data lines; a plurality of first electrodes, each of which is formed between the pixel electrodes and in parallel with the gate line, the pixel electrodes being adjacent to each other with the gate line interposed therebetween; a plurality of second electrodes formed in parallel with the data lines, at least a portion of each of the plurality of second electrodes overlapping the pixel electrode; and a shielding electrode formed between each first electrode and each second electrode.

The shielding electrodes includes a first shielding electrode formed between a first pixel electrode of the two adjacent pixel electrodes and the first electrode adjacent to the first pixel electrode, and a second shielding electrode formed between the first electrode and a second pixel electrode of the two adjacent pixel electrodes.

The first and second shielding electrodes are formed on the same layer as the second electrode and are formed on a layer different from the pixel electrode and the first electrode.

The first and second shielding electrodes are formed on the same layer as the pixel electrode and the first electrode and are formed on a layer different from the second electrode.

In another aspect, there is a touch sensor integrated type display device including a plurality of gate lines and a plurality of data lines which are formed to cross over each other; a plurality of pixel electrodes respectively formed in areas defined by crossings of the plurality of gate lines and the plurality of data lines; a plurality of first electrodes formed in parallel with the data lines, at least a portion of each of the plurality of firsts electrodes overlapping the pixel electrode; a plurality of second electrodes, each of which is formed between the pixel electrodes and in parallel with the gate line, the pixel electrodes being adjacent to each other with the gate line interposed therebetween; and a shielding electrode formed between each first electrode and each second electrode.

The shielding electrode includes a first shielding electrode formed between a first pixel electrode of the two adjacent pixel electrodes and the second electrode adjacent to the first pixel electrode, and a second shielding electrode formed between the second electrode and a second pixel electrode of the two adjacent pixel electrodes.

The first and second shielding electrodes are formed on the same layer as the second electrode and the pixel electrode, and are formed on a layer different from the first electrodes.

The first and second shielding electrodes are formed on the same layer as the first electrode and are formed on a layer different from the first electrode and the pixel electrode.

As described above, the touch sensor integrated type display device according to the embodiments of the invention can use the common electrode, which is used to form an electric field required to drive liquid crystals of the display device, along with the pixel electrode as the touch driving electrode or the touch sensing electrode, and thus the touch driving electrode or the touch sensing electrode does not need to be separately formed. Hence, a process for forming the touch driving electrode or the touch sensing electrode can be omitted, and a thickness of the touch sensor integrated type display device can be reduced by a thickness of the touch driving electrode or the touch sensing electrode.

Furthermore, in the touch sensor integrated type display device according to the embodiments of the invention, the first and second shielding electrodes are formed between the touch driving electrode serving as the common electrode and the touch sensing electrode or between the touch sensing electrode serving as the common electrode and the touch driving electrode. Therefore, a shielding effect of the electric field is generated by the first and second shielding electrodes, and a behavior of liquid crystals may be reduced. Hence, a change amount of the capacitance generated by the common electrode may decrease.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. In the following description, a touch sensor integrated type liquid crystal display is used as an example of a touch sensor integrated type display device.

Figure 1:
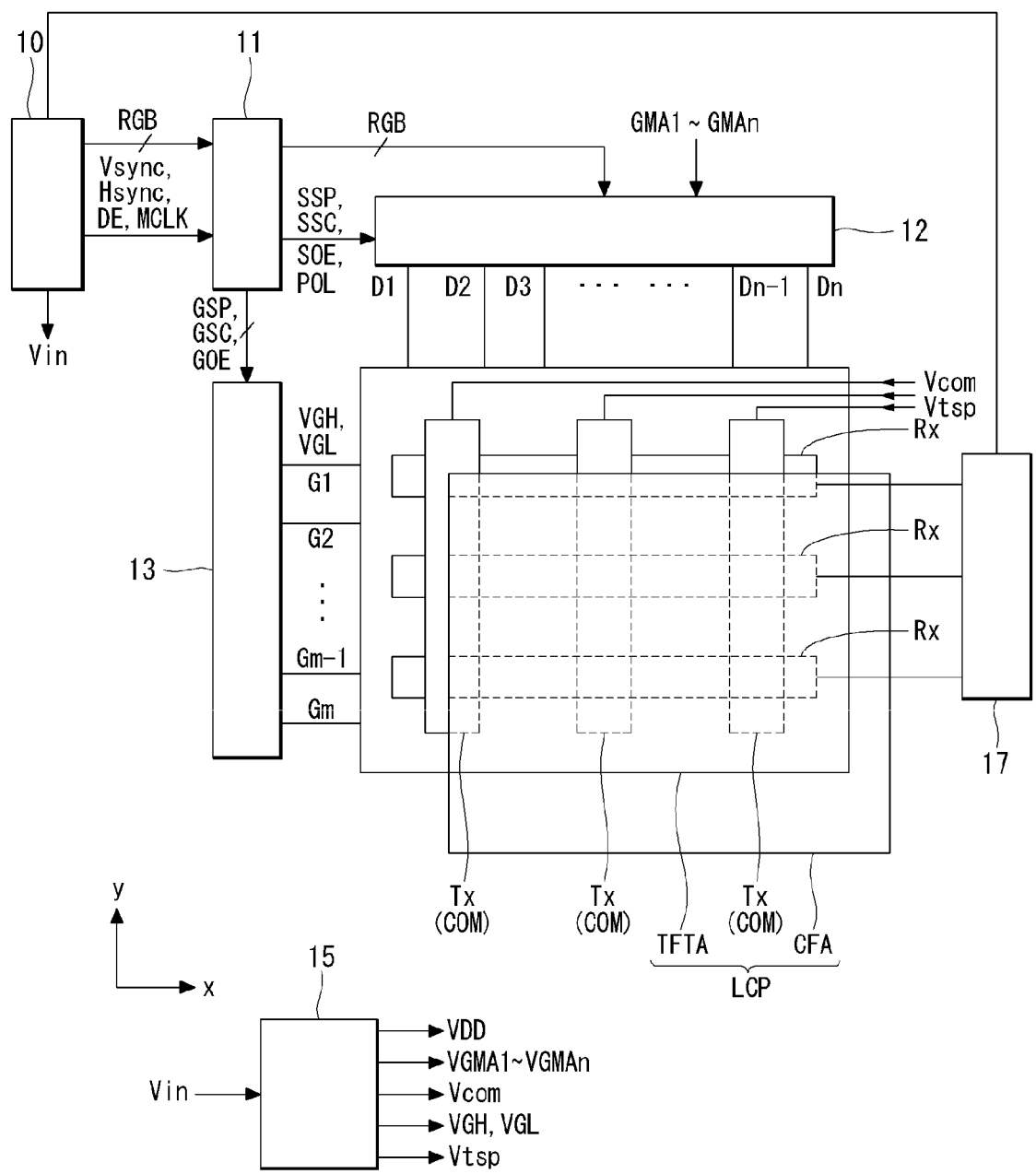
FIG. 1 is a block diagram schematically showing a touch sensor integrated type display device according to a first embodiment of the invention.
Figure 2:
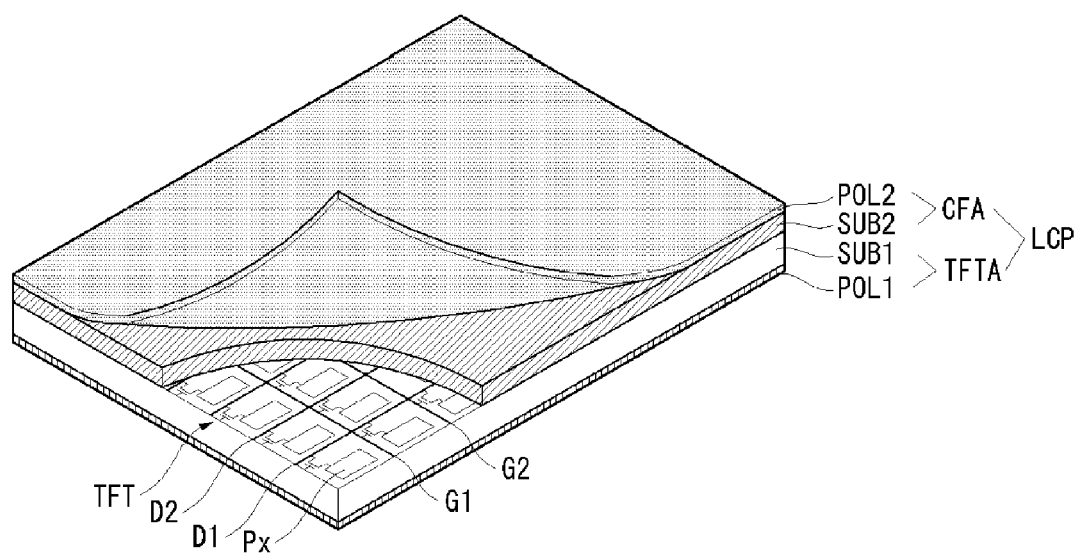
FIG. 2 is a partial exploded perspective view schematically showing the touch sensor integrated type display device shown in FIG. 1.

A touch sensor integrated type display device according to a first embodiment of the invention is described in detail with reference to FIGS. 1 and 2. FIG. 1 is a block diagram schematically showing a touch sensor integrated type display device according to a first embodiment of the invention. FIG. 2 is a partial exploded perspective view schematically showing the touch sensor integrated type display device shown in FIG. 1.

As shown in FIG. 1, a touch sensor integrated type liquid crystal display according to the first embodiment of the invention includes a liquid crystal display panel LCP, a host controller 10, a timing controller 11, a data driver 12, a gate driver 13, a power supply unit 15, and a touch recognition processor 17.

The liquid crystal display panel LCP includes a color filter array CFA and a thin film transistor (TFT) array TFTA which are positioned opposite each other with a liquid crystal layer (not shown) interposed therebetween.

As shown in FIGS. 1 and 2, the TFT array TFTA includes a plurality of gate lines G1, G2, . . . , Gm which are formed in parallel on a first substrate SUB1 in a first direction (for example, x-axis direction), a plurality of data lines D1, D2, . . . , Dn which are formed in parallel in a second direction (for example, y-axis direction) to cross the plurality of gate lines G1, G2, . . . , Gm, thin film transistors TFT formed at crossings of the gate lines G1, G2, . . . , Gm and the data lines D1, D2, . . . , Dn, a plurality of pixel electrodes Px for charging liquid crystal cells to a data voltage, a plurality of common electrodes COM (serving as a touch driving electrode) positioned opposite the plurality of pixel electrodes Px, and a plurality of touch sensing electrodes Rx.

The common electrodes COM are formed on a second substrate SUB2 in a vertical electric field driving manner such as a twisted nematic (TN) mode and a vertical alignment (VA) mode. Further, the common electrodes COM are formed on the first substrate SUB1 along with the pixel electrodes Px in a horizontal electric field driving manner such as an in-plane switching (IPS) mode and a fringe field switching (FFS) mode. In the embodiment of the invention, the common electrodes COM in the horizontal electric field driving manner are described as an example.

As described above, the common electrode COM serves as a touch driving electrode Tx. Thus, the common electrode COM is referred to as the touch driving electrode Tx, the touch driving electrode Tx serving as the common electrode, or the common electrode COM serving as the touch driving electrode, if necessary or desired. The first embodiment of the invention described that the common electrode COM serves as the touch driving electrode Tx as well as the common electrode COM, but is not limited thereto. The common electrode COM may be configured to serve as the touch sensing electrode. In this instance, the touch sensing electrode according to the first embodiment of the invention is configured as the touch driving electrode.

The common electrode COM of the touch sensor integrated type display device according to the first embodiment of the invention includes a plurality of common electrodes divided in parallel in the first direction (for example, x-axis direction) or the second direction (for example, y-axis direction). For example, in the first embodiment of the invention, the plurality of common electrodes COM are arranged in the x-axis direction and divided in the y-axis direction. The common electrodes COM serve as a plurality of touch sensing electrodes Rx constituting a touch sensor.

The plurality of touch driving electrodes Tx of the TFT array TFTA are divided in parallel along the first direction (for example, x-axis direction) crossing the touch sensing electrodes Rx.

Figure 3:
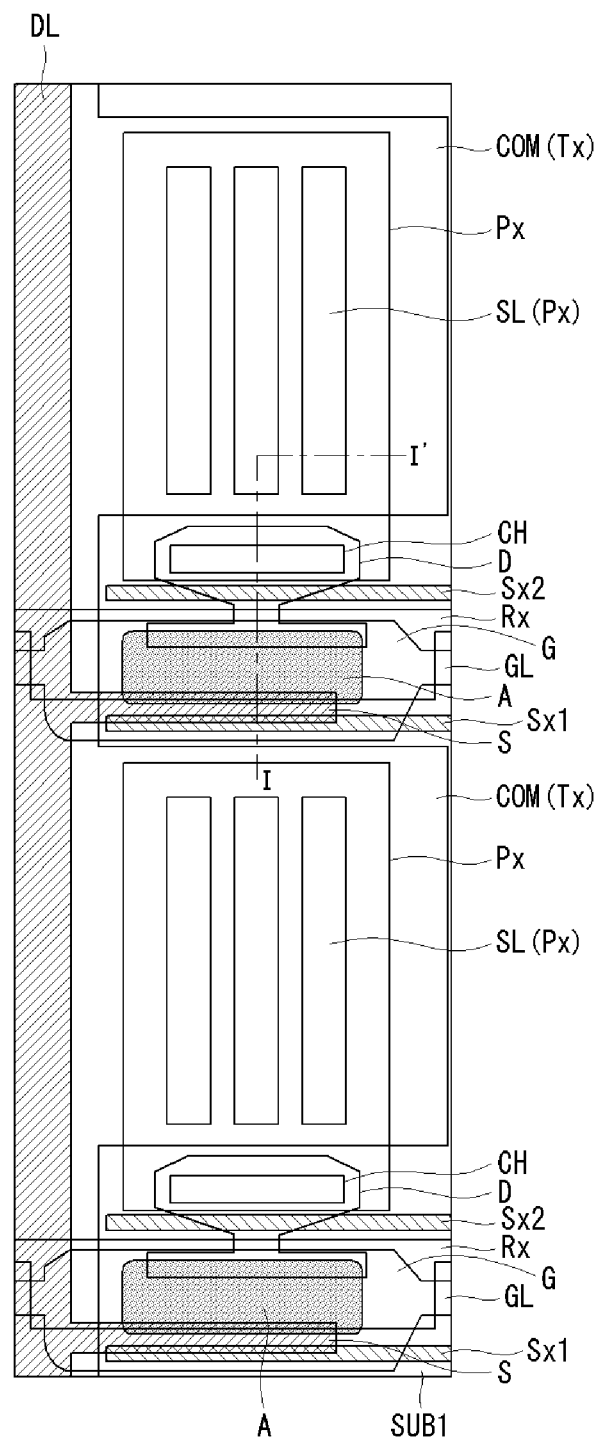
FIG. 3 is a plane view showing a portion of the touch sensor integrated type display device according to the first embodiment of the invention.
Figure 4A:
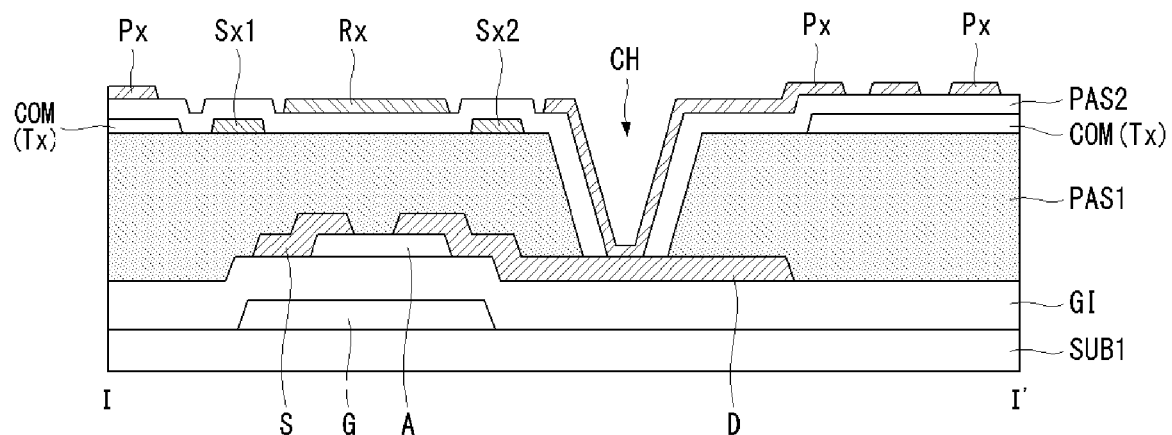
FIG. 4A is a cross-sectional view taken along line I-I' of FIG. 3, more specifically, a cross-sectional view showing an example where first and second shielding electrodes are formed on a first passivation layer.
Figure 4B:
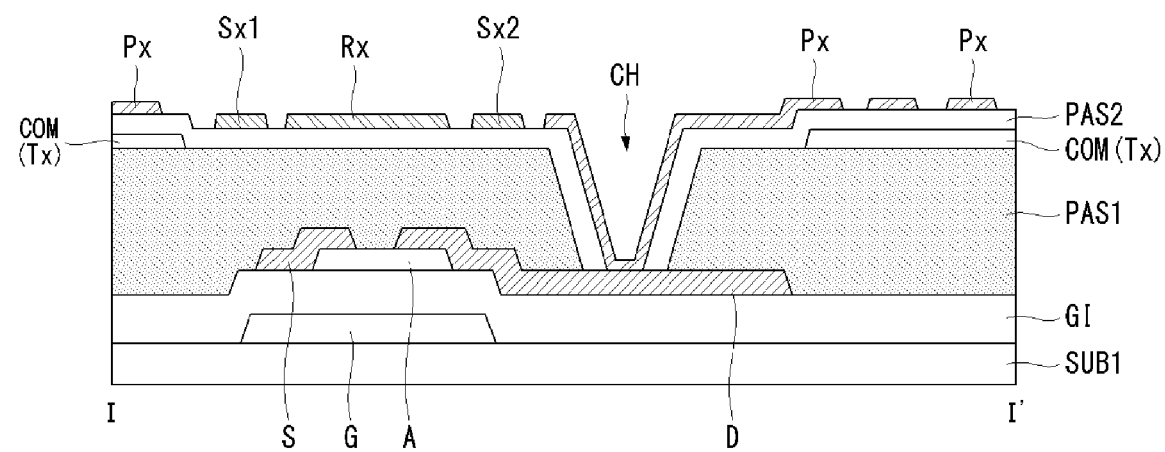
FIG. 4B is a cross-sectional view taken along line I-I' of FIG. 3, more specifically, a cross-sectional view showing an example where first and second shielding electrodes are formed on a second passivation layer.

The TFT array TFTA according to the first embodiment of the invention is described in detail below with reference to FIGS. 3, 4A, and 4B. FIG. 3 is a plane view showing a portion of the TFT array TFTA of the touch sensor integrated type display device according to the first embodiment of the invention. FIG. 4A is a cross-sectional view taken along line I-I' of FIG. 3, more specifically, a cross-sectional view showing an example where first and second shielding electrodes are formed on a first passivation layer. FIG. 4B is a cross-sectional view taken along line I-I' of FIG. 3, more specifically, a cross-sectional view showing an example where first and second shielding electrodes are formed on a second passivation layer.

As shown in FIGS. 3 and 4A, the TFT array TFTA according to the first embodiment of the invention includes gate lines GL and data lines DL which are formed on the first substrate SUB1 to cross over each other, thin film transistors TFT formed at crossings of the gate lines GL and the data lines DL, pixel electrodes Px formed in areas defined by a crossing structure of the gate lines GL and the data lines DL, touch sensing electrodes Rx formed between the pixel electrodes Px, which are adjacent to each other with the gate line GL interposed therebetween, and common electrodes COM serving as the touch driving electrode positioned opposite the pixel electrodes Px.

Each thin film transistor TFT includes a gate electrode G which is formed on the first substrate SUB1 and extends from the gate line GL, an active layer A which is formed on a gate insulation layer GI covering the gate line GL and the gate electrode G at a location corresponding to the gate electrode G, a source electrode S extending from the data line DL which is formed on a first passivation layer PAS1 covering the active layer A, and a drain electrode D positioned opposite the source electrode S. The thin film transistor TFT thus formed is covered by the first passivation layer PAS1, and a portion of the drain electrode D of the thin film transistor TFT is exposed through a contact hole CH formed in the first passivation layer PAS1.

The plurality of common electrodes COM serving as the touch driving electrode are formed on the first passivation layer PAS1 covering the thin film transistors TFT and the data lines DL, thereby forming lines in the y-axis direction. The common electrode COM forming the line in the y-axis direction is formed so that it does not overlap a formation area of the contact hole CH and a formation area of the thin film transistor TFT in each pixel area. First and second shielding electrodes Sx1 and Sx2, which are separated from each other and are separated from the common electrode COM, are formed on both sides of the thin film transistor TFT. The first shielding electrode Sx1 is formed on the first passivation layer PAS1 between the common electrode COM adjacent to the source electrode S of the thin film transistor TFT and the touch sensing electrode Rx. The second shielding electrode Sx2 is formed on the first passivation layer PAS1 between the pixel electrode Px adjacent to the drain electrode D of the thin film transistor TFT and the touch sensing electrode Rx. The first and second shielding electrodes Sx1 and Sx2 are separated from each other at a predetermined distance therebetween.

The second passivation layer PAS2 is formed on the entire surface of the first passivation layer PAS1, on which the touch driving electrodes Tx and the first and second shielding electrodes Sx1 and Sx2 are formed. The contact hole CH passing through the first and second passivation layers PAS1 and PAS2 is formed, thereby exposing a portion of the drain electrode D.

The pixel electrodes Px and the touch sensing electrodes Rx are formed on the second passivation layer PAS2, in which the contact holes CH are formed. The pixel electrodes Px are formed in the areas defined by the crossing structure of the gate lines GL and the data lines DL and are connected to the drain electrodes D of the thin film transistors TFT exposed through the contact holes CH. The pixel electrode Px is formed in an area other than a formation area of a pattern of the first shielding electrode Sx1, but overlaps a pattern of the second shielding electrode Sx2. The touch sensing electrode Rx is formed between the pixel electrodes Px which are adjacent to each other with the gate line GL interposed therebetween to disposed between the first and second shielding electrodes Sx1 and Sx2.

In the touch sensor integrated type display device according to the first embodiment of the invention, as shown in FIGS. 3 and 4A, the common electrode COM serving as the touch driving electrode formed on the first passivation layer PAS1 has no slit, and the pixel electrode Px formed on the second passivation layer PAS2 have slits SL.

The color filter array CFA includes black matrixes (not shown) and color filters (not shown), which are formed on the second substrate SUB2, and a column spacer (not shown) for maintaining cell gaps of the liquid crystal cells.

As shown in FIG. 2, polarizing plates POL1 and POL2 are respectively attached to outer surfaces of the first substrate SUB1 of the TFT array TFTA and the second substrate SUB2 of the color filter array CFA. Alignment layers (not shown) for setting a pre-tilt angle of liquid crystals are respectively formed on inner surfaces of the first substrate SUB1 and the second substrate SUB2 contacting the liquid crystals.

FIG. 4B shows the touch sensor integrated type display device according to a modified example of the first embodiment of the invention. Since configuration illustrated in FIG. 4B is substantially the same as the configuration illustrated in FIG. 4A except that the first and second shielding electrodes Sx1 and Sx2 are formed on the second passivation layer PAS2, a further description may be briefly made or may be entirely omitted.

Figure 5:
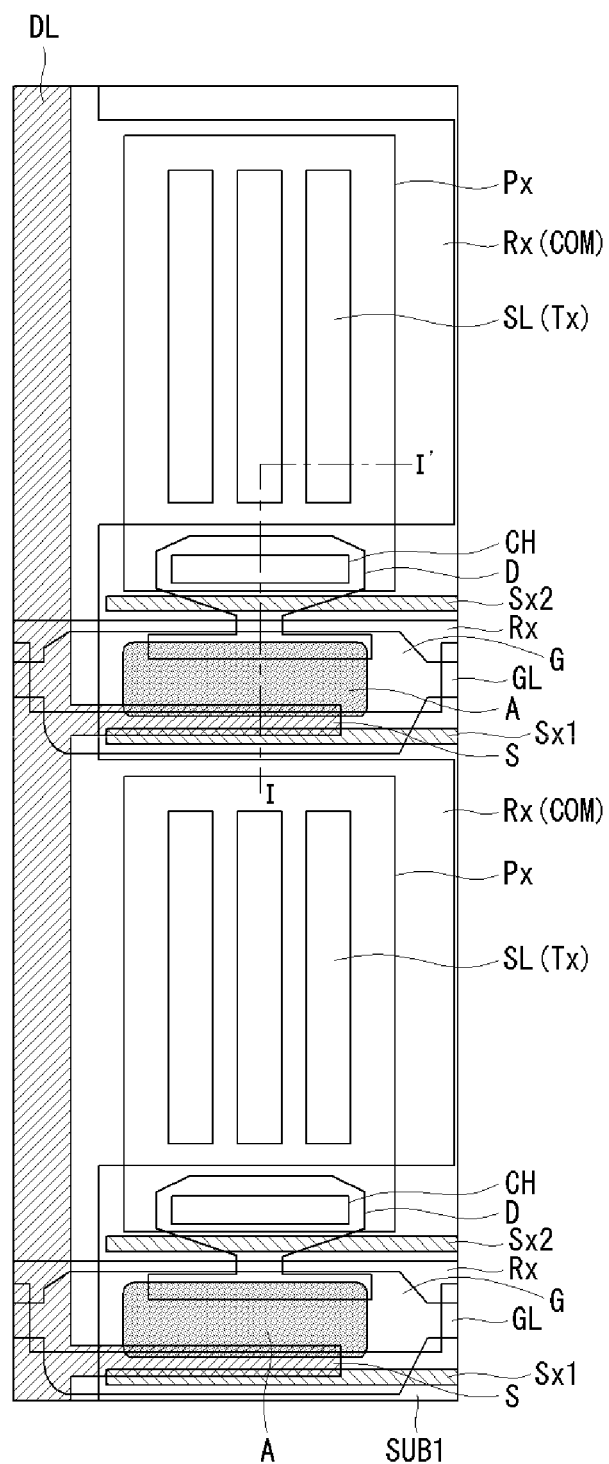
FIG. 5 is a plane view showing a portion of a touch sensor integrated type display device according to a second embodiment of the invention.
Figure 6A:
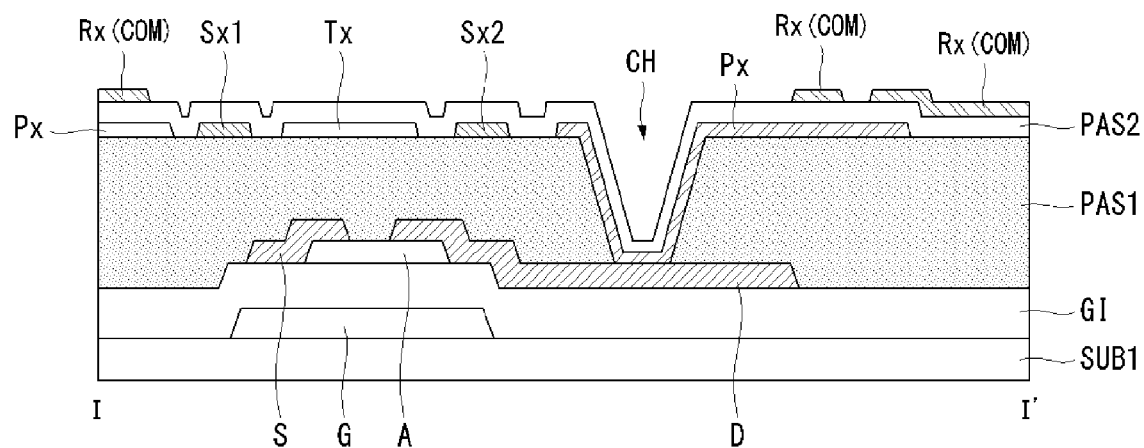
FIG. 6A is a cross-sectional view taken along line I-I' of FIG. 5, more specifically, a cross-sectional view showing an example where first and second shielding electrodes are formed on a first passivation layer.
Figure 6B:
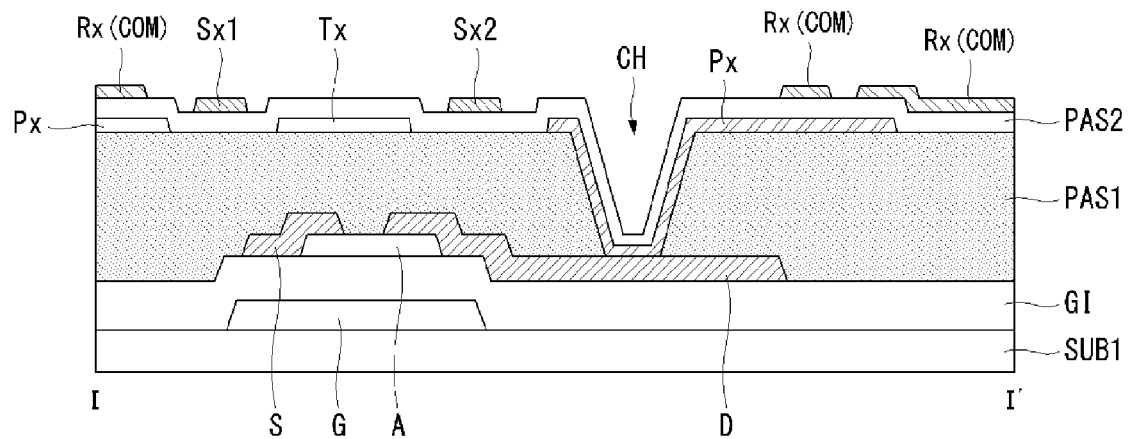
FIG. 6B is a cross-sectional view taken along line I-I' of FIG. 5, more specifically, a cross-sectional view showing an example where first and second shielding electrodes are formed on a second passivation layer.

Next, a touch sensor integrated type display device according to a second embodiment of the invention is described with reference to FIGS. 5, 6A, and 6B. FIG. 5 is a plane view showing a portion of a touch sensor integrated type display device according to a second embodiment of the invention. FIG. 6A is a cross-sectional view taken along line I-I' of FIG. 5, more specifically, a cross-sectional view showing an example where first and second shielding electrodes are formed on a first passivation layer. FIG. 6B is a cross-sectional view taken along line I-I' of FIG. 5, more specifically, a cross-sectional view showing an example where first and second shielding electrodes are formed on a second passivation layer.

As shown in FIGS. 5 and 6A, a thin film transistor (TFT) array TFTA according to the second embodiment of the invention includes gate lines GL and data lines DL which are formed on a first substrate SUB1 to cross over each other, thin film transistors TFT formed at crossings of the gate lines GL and the data lines DL, pixel electrodes Px formed in areas defined by a crossing structure of the gate lines GL and the data lines DL, touch driving electrodes Tx formed between the pixel electrodes Px, which are adjacent to each other with the gate line GL interposed therebetween, common electrodes COM serving as a touch sensing electrode positioned opposite the pixel electrodes Px, and first and second shielding electrodes Sx1 and Sx2 which are formed between the common electrode COM serving as the touch sensing electrode and the touch driving electrode Tx to form an electric field along with the common electrode COM. Hence, the first and second shielding electrodes Sx1 and Sx2 reduce an influence of the electric field by a common voltage on liquid crystals.

Each thin film transistor TFT includes a gate electrode G which is formed on the first substrate SUB1 and extends from the gate line GL, an active layer A which is formed on a gate insulation layer GI covering the gate line GL and the gate electrode G at a location corresponding to the gate electrode G, a source electrode S extending from the data line DL which is formed on a first passivation layer PAS1 covering the active layer A, and a drain electrode D positioned opposite the source electrode S. The thin film transistor TFT thus formed is covered by the first passivation layer PAS1, and a portion of the drain electrode D of the thin film transistor TFT is exposed through a contact hole CH formed in the first passivation layer PAS1.

The pixel electrodes Px, the touch driving electrodes Tx, and the first and second shielding electrodes Sx1 and Sx2 are formed on the first passivation layer PAS1 covering the thin film transistors TFT and the data lines DL. The pixel electrodes Px are formed in the areas defined by the crossing structure of the gate lines GL and the data lines DL and are connected to the drain electrodes D of the thin film transistors TFT exposed through the contact holes CH. The touch driving electrode Tx is formed between the pixel electrodes Px which are adjacent to each other with the gate line GL interposed therebetween. The first and second shielding electrodes Sx1 and Sx2 are respectively formed between the touch driving electrode Tx and the pixel electrodes Px which are adjacent to each other with the gate line GL interposed therebetween.

A second passivation layer PAS2 is formed on the entire surface of the first passivation layer PAS1, on which the pixel electrodes Px, the touch driving electrodes Tx, and the first and second shielding electrodes Sx1 and Sx2 are formed.

Touch sensing electrodes Rx are formed on the second passivation layer PAS2. The pixel electrodes Px are formed in the areas defined by the crossing structure of the gate lines GL and the data lines DL and are connected to the drain electrodes D of the thin film transistors TFT exposed through the contact holes CH. The pixel electrode Px is formed in an area other than a formation area of a pattern of the first shielding electrode Sx1, but overlaps a pattern of the second shielding electrode Sx2. At least a portion of the touch sensing electrode Rx overlaps the pixel electrode Px.

In the touch sensor integrated type display device according to the second embodiment of the invention, as shown in FIGS. 5 and 6A, the pixel electrode Px formed on the first passivation layer PAS1 has no slit, and the common electrode COM serving as the touch sensing electrode formed on the second passivation layer PAS2 have slits SL.

FIG. 6B shows the touch sensor integrated type display device according to a modified example of the second embodiment of the invention. Since configuration illustrated in FIG. 6B is substantially the same as the configuration illustrated in FIG. 6A except that the first and second shielding electrodes Sx1 and Sx2 are formed on the second passivation layer PAS2, a further detailed description may be briefly made or may be entirely omitted.

Referring again to FIGS. 1, 3 and 5, the gate driver 13 sequentially outputs a gate pulse (or a scan pulse) under the control of the timing controller 11 in a display mode. The gate driver 13 shifts a swing voltage of the gate pulse to a gate high voltage VGH and a gate low voltage VGL. The gate pulse output from the gate driver 13 is synchronized with the data voltage output from the data driver 12 and is sequentially supplied to the gate lines G1 to Gm. The gate high voltage VGH is equal to or greater than a threshold voltage of the thin film transistor TFT, and the gate low voltage VGL is less than the threshold voltage of the thin film transistor TFT. A plurality of gate driving integrated circuits (ICs) of the gate driver 13 may be connected to the gate lines G1 to Gm formed on the first substrate SUBS1 of the TFT array TFTA through a tape automated bonding (TAB) process. Alternatively, the gate driving ICs of the gate driver 13 may be directly formed on the first substrate SUBS1 of the TFT array TFTA along with pixels through a gate-in-panel (GIP) process.

The data driver 12 samples and latches digital video data RGB under the control of the timing controller 11. The data driver 12 inverts a polarity of the data voltage of the digital video data RGB based on positive and negative gamma compensation voltages GMA1 to GMAn supplied from the power supply unit 15 and outputs the positive and negative data voltages. The positive and negative data voltages output from the data driver 12 are synchronized with the gate pulses output from the gate driver 13. A plurality of source driving ICs of the data driver 12 may be connected to the data lines D1 to Dn formed on the first substrate SUBS1 of the TFT array TFTA through a chip-on glass (COG) process or the TAB process. The source driving ICs may be integrated inside the timing controller 11 and thus may be implemented as one chip IC along with the timing controller 11.

The timing controller 11 generates timing control signals for controlling operation timings of the gate driver 13 and the data driver 12 using timing signals Vsync, Hsync, DE, and MCLK, which are received from the external host controller 10 and are used to drive the touch sensor integrated type display device. The timing control signals include a gate timing control signal for controlling the operation timing of the gate driver 13 and a data timing control signal for controlling the operation timing of the data driver 12 and the polarity of the data voltage.

The gate timing control signal includes a gate start pulse GSP, a gate shift clock GSC, a gate output enable signal GOE, and the like. The gate start pulse GSP is applied to a first gate driving IC of the gate driver 13, which will output a first gate pulse in each frame period, and controls a shift start timing of the first gate driving IC. The gate shift clock GSC is commonly input to the gate driving ICs of the gate driver 13 and also shifts the gate start pulse GSP. The gate output enable signal GOE controls output timings of the gate driving ICs of the gate driver 13.

The data timing control signal includes a source start pulse SSP, a source sampling clock SSC, a polarity control signal POL, a source output enable signal SOE, and the like. The source start pulse SSP is applied to a first source driving IC of the data driver 12 to firstly sample the data and controls a data sampling start timing. The source sampling clock SSC controls a sampling timing of data inside the source driving ICs based on a rising or falling edge thereof. The polarity control signal POL controls the polarity of the data voltage output from the source driving ICs. The source output enable signal SOE controls output timings of the source driving ICs. If the digital video data RGB is input to the data driver 12 through a mini low voltage differential signaling (LVDS) interface, the source start pulse SSP and the source sampling clock SSC may be omitted.

The power supply unit 15 is implemented as a DC-DC converter including a pulse width modulation (PWM) circuit, a boost converter, a regulator, a charge pump, a voltage divider, an operational amplifier, etc. The power supply unit 15 regulates a voltage input from the host controller 10 and generates voltages required to drive the liquid crystal display panel LCP, the data driver 12, the gate driver 13, the timing controller 11, and the backlight unit (not shown).

The voltages generated by the power supply unit 15 include a high potential power voltage VDD, the gate high voltage VGH, the gate low voltage VGL, the common voltage Vcom, positive and negative gamma reference voltages VGMA1 to VGMAn, a touch driving voltage Vtsp, and the like. The common voltage Vcom is supplied to all of the common electrodes COM under the control of the host controller 10 when a display operation is performed. Alternatively, the common voltage Vcom may be supplied to all of the common electrodes COM under the control of the timing controller 11 when the display operation is performed. The touch driving voltage Vtsp is supplied to the touch driving electrodes Tx under the control of the host controller 10 when a touch operation is performed. Alternatively, the touch driving voltage Vtsp may be supplied to the touch driving electrodes Tx under the control of the timing controller 11 when the touch operation is performed. The embodiment of the invention describes that the touch driving voltage Vtsp is supplied to the touch driving electrodes Tx through the power supply unit 15, but is not limited thereto. For example, the touch driving voltage Vtsp may be supplied to the touch driving electrodes Tx through the touch recognition processor 17 controlled by the host controller 10 or the timing controller 11.

The host controller 10 transfers the digital video data RGB of an input image and the timing signals Vsync, Hsync, DE, and MCLK required to perform the display driving operation to the timing controller 11 through an interface, such as a low voltage difference signaling (LVDS) interface and a transition minimized differential signaling (TMDS) interface. When the display driving operation for displaying the image on the screen of the touch sensor integrated type liquid crystal display is performed, the host controller 10 supplies a control signal Vin to the power supply unit 15, so that the plurality of common electrodes COM may receive the common voltage Vcom of the same voltage level. Further, when the touch driving operation for the touch recognition is performed, the host controller 10 supplies the control signal Vin to the power supply unit 15, so that the touch driving voltage Vtsp may be supplied to the touch driving electrodes Tx.

The touch recognition processor 17 differentially amplifies a voltage of an initial capacitance of each of the touch sensing electrodes Rx before a touch operation and a voltage of a touch capacitance of each of the touch sensing electrodes Rx after the touch operation. The touch recognition processor 17 then converts a result of the differential amplification into digital data. The touch recognition processor 17 decides a touch position based on a difference between the initial capacitance and the touch capacitance of each of the touch sensing electrodes Rx using a touch recognition algorithm and outputs touch coordinate data indicating the touch position to the host controller 10.

As described above, in the touch sensor integrated type display device according to the embodiment of the invention, because the touch sensor and the display device are integratedly formed, the common voltage is supplied to the common electrode for the display driving operation. A change is generated in the electric field between the touch driving electrode and the touch sensing electrode because of the common voltage. Further, a behavior (i.e., rotation) of the liquid crystals filled in a space between the color filter array CFA and the TFT array TFTA is generated by the change in the electric field. Therefore, the behavior of the liquid crystals generates changes in the capacitance between the touch driving electrode and the touch sensing electrode. In this instance, when the touch driving voltage is applied to the touch driving electrode, the touch sensor integrated type display device sense that there is the change in the mutual capacitance between the touch driving electrode and the touch sensing electrode. Hence, although the touch operation is not generated, the touch sensor integrated type display device senses that the touch operation is performed.

In the touch sensor integrated type display device according to the first and second embodiments of the invention, the first and second shielding electrodes Sx1 and Sx2 are formed between the touch driving electrode serving as the common electrode and the touch sensing electrode or between the touch sensing electrode serving as the common electrode and the touch driving electrode. Therefore, a shielding effect of the electric field is generated by the first and second shielding electrodes Sx1 and Sx2, and the behavior of the liquid crystals may be reduced. Hence, a change amount of the capacitance generated by the common electrode may decrease.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensor integrated type display device, comprising:
   a plurality of gate lines and a plurality of data lines which are formed to cross over each other;
   a plurality of pixel electrodes respectively formed in areas defined by crossings of the plurality of gate lines and the plurality of data lines;
   a plurality of first electrodes, each of which is formed between the pixel electrodes and in parallel with the gate line, the pixel electrodes being adjacent to each other with the gate line interposed therebetween;
   a plurality of second electrodes formed in parallel with the data lines, at least a portion of each of the plurality of second electrodes overlapping the pixel electrode; and
   shielding electrodes formed between the first electrode and the pixel electrode,
   wherein the shielding electrode includes a first shielding electrode formed between a first pixel electrode of the two adjacent pixel electrodes and the first electrode adjacent to the first pixel electrode, and a second shielding electrode formed between the first electrode and a second pixel electrode of the two adjacent pixel electrodes.

2. The touch sensor integrated type display device of claim 1, wherein the first and second shielding electrodes are formed on the same layer as the second electrode and are formed on a layer different from the pixel electrode and the first electrode.

3. The touch sensor integrated type display device of claim 1, wherein the first and second shielding electrodes are formed on the same layer as the pixel electrode and the first electrode and are formed on a layer different from the second electrode.

4. A touch sensor integrated type display device, comprising:
- a plurality of gate lines and a plurality of data lines which are formed to cross over each other;
- a plurality of pixel electrodes respectively formed in areas defined by crossings of the plurality of gate lines and the plurality of data lines;
- a plurality of first electrodes formed in parallel with the data lines, at least a portion of each of the plurality of firsts electrodes overlapping the pixel electrode;
- a plurality of second electrodes, each of which is formed between the pixel electrodes and in parallel with the gate line, the pixel electrodes being adjacent to each other with the gate line interposed therebetween; and
- a shielding electrode formed between each first electrode and each second electrode,
- wherein the shielding electrode includes a first shielding electrode formed between a first pixel electrode of the two adjacent pixel electrodes and the second electrode adjacent to the first pixel electrode, and a second shielding electrode formed between the second electrode and a second pixel electrode of the two adjacent pixel electrodes.

5. The touch sensor integrated type display device of claim 4, wherein the first and second shielding electrodes are formed on the same layer as the second electrode and the pixel electrode, and are formed on a layer different from the first electrodes.

6. The touch sensor integrated type display device of claim 4, wherein the first and second shielding electrodes are formed on the same layer as the first electrode and are formed on a layer different from the first electrodes and the pixel electrodes.

* * * * *